Oct. 4, 1960

M. KLEIN 2,955,286

PLURAL LOOP ANTENNA HAVING FERRITE CORES

Filed Feb. 24, 1958

INVENTOR.
MORRIS KLEIN
BY Diggins & LeBlanc
ATTORNEYS

Oct. 4, 1960    M. KLEIN    2,955,286
PLURAL LOOP ANTENNA HAVING FERRITE CORES
Filed Feb. 24, 1958    2 Sheets-Sheet 2

INVENTOR.
MORRIS KLEIN
BY
ATTORNEYS

United States Patent Office 2,955,286
Patented Oct. 4, 1960

2,955,286
PLURAL LOOP ANTENNA HAVING FERRITE CORES

Morris Klein, Columbus, Ohio, assignor to International Research & Development Corporation, Columbus, Ohio, a corporation of Ohio Filed Feb. 24, 1958, Ser. No. 716,954

3 Claims. (Cl. 343—742)

This invention relates to radio guidance systems for mobile craft and more particularly to an improved antenna unit for use in an automatic direction finding system for aircraft.

In assignee's copending application Serial No. 685,486, filed September 23, 1957, there is disclosed a radio guidance system for aircraft, commonly referred to as an automatic direction finding system. According to that system three loop antennas have their axes disposed at equal angles of 120 degrees from one another and are connected to an indication producing device. The loops are preferably of identical electrical characteristics, i.e., inductance, capacitance, resistance and Q so that they produce identical signals under similar conditions with respect to the radiation source.

Since the direction finding system disclosed in the aforementioned copending application is designed for use upon all types of aircraft, and in particular on light weight private aircraft, it is desirable that the antenna system present a minimum weight and bulk and that it be susceptible of mounting upon different types of aircraft without modification of the aircraft itself.

An antenna unit of this type is disclosed in the assignee's copending application Serial No. 681,361, filed August 30, 1957, wherein the three antenna loops are mounted one above the other.

The antenna unit of the present invention represents an improvement on that antenna unit in that it utilizes a smaller number of parts, is easier to assemble, and does not involve critical loop spacings as was the case with the prior unit.

It is accordingly a primary object of the present invention to provide an antenna unit which may be produced in an economical manner and which is light weight, small and rugged and which may be mounted on existing aircraft without modification of the aircraft.

It is another object of the invention to provide a three loop antenna unit which is rugged, small, not subject to changes in electrical characteristics with variation in temperature, humidity, or the normal wear and tear to which it is subjected in use upon an aircraft.

It is a still further object of the invention to provide a multi-loop antenna unit wherein the spacing of the individual loops are not critical.

It is a still additional object of the invention to provide an antenna unit of the foregoing type utilizing a minimum number of parts and manufacturable at a relatively low cost.

These and further objects and advantages of the invention will become more apparent upon reference to the following specification and claims and the appended drawings wherein:

Figure 1:
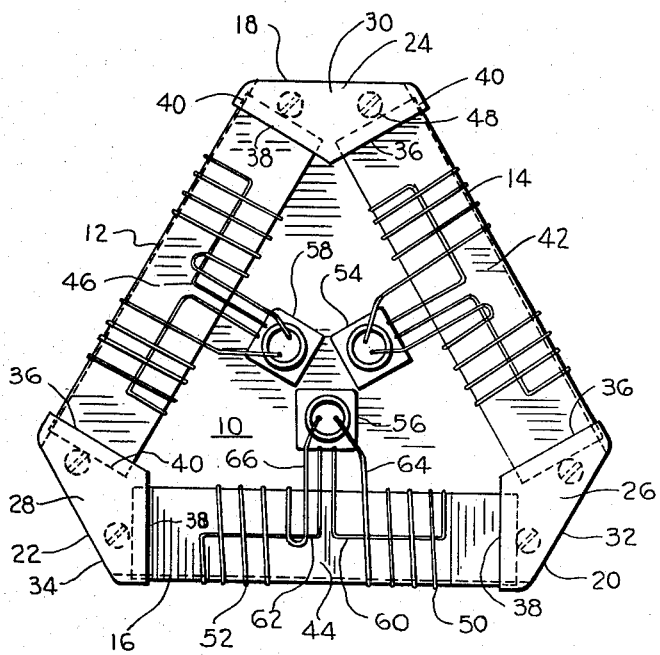
Figure 1 is a plan view of an antenna unit constructed according to one embodiment of the present invention.

Referring more particularly to the figures of the drawing, the antenna unit of the invention consists of a mounting plate 10 which is in the general form of an equilateral triangle having sides 12, 14 and 16 and truncated apexes 18, 20 and 22. This mounting plate may be formed of any suitable thermo-setting or thermo-plastic material and may comprise a panel of a phenolic resin, such as the commercial resin panels sold under the trade name of "Formica XXXP."

Mounted at the truncated apexes of the mounting plate 10 are three mounting blocks 24, 26 and 28 which are generally triangular in form. Each mounting block 24, 26 and 28 has a vertical outer face 30, 32, 34 which is flush with the truncated apex 18, 20, 22 of its respective corner of the mounting plate. Each mounting plate is also provided with a pair of vertical inner faces 36 and 38 which are at an angle of 120 degrees with respect to one another. Each face 36, 38 is slotted as shown at 40 and receives the end of a ferrite core.

Figure 2:
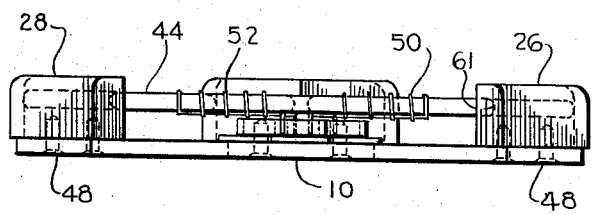
Figure 2 is a vertical elevation of the antenna unit of Figure 1.

Three ferrite cores 42, 44 and 46 are mounted between the mounting blocks 24, 26 and 28 and are spaced from the mounting plate 10 as may be seen in Figure 2. The slots 40 are of such a size as to tightly receive the ends of the ferrite cores so as to furnish a snug and firm mounting therefor and thus eliminate the necessity of additional mounting hardware. The mounting blocks 24, 26 and 28 may be formed of any suitable material such as a fabric impregnated phenolic base.

The mounting blocks 24, 26 and 28 and the ferrite cores which are received therein are secured to the mounting plate 10 by a series of flat headed screws 48 which pass through the mounting plate and screw threadedly engage the mounting blocks.

Each ferrite core has its surface wound with a layer of electrical tape and the loop coils are wound on such tape. Each loop consists of a pair of windings 50—52 which are identical and which are spaced equal distances from the center of the ferrite core. The coil turns are bonded in place with a low loss coil dope or electrical tape.

The edges of the ferrite cores are rounded as shown at 61 in Figure 2 in order to facilitate the winding of the loops and their firm engagement with the cores.

The terminals of the coils are connected to three connectors 54, 56 and 58 or may be connected to a single multiple connector. The outer end connections or terminals 60 and 62 are connected to a common point and the inner terminals 64 and 66 are connected to separate insulated contacts in the connectors.

When the loops are mounted in the foregoing manner, it is found that there is no criticality in loop spacing and that the electrical characteristics of the loops do not tend to change in diverse manners as a result of vibration, temperature or humidity changes.

In a specific example of an antenna unit constructed according to this invention, ferrite cores ¼" thick, 1⅜" wide and 6⅛" long were used. The cores were spaced ½" from the surface of the mounting plate 10 and opposing vertical faces 36 and 38 of the mounting blocks were 5¾" apart. Each coil 50—52 consisted of 11 turns of No. 18 enameled wire with the turns spaced ⅛" on centers.

Figure 3:
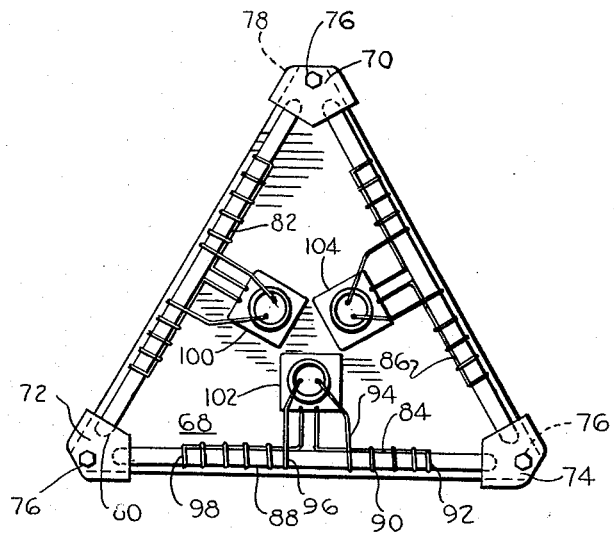
Figure 3 is a plan view of another embodiment of an antenna unit constructed according to the invention.
Figure 4:
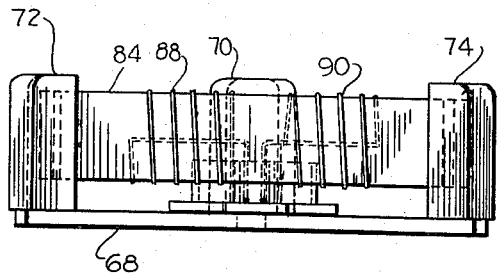
Figure 4 is a vertical elevation of the antenna unit shown in Figure 3.

Referring to Figures 3 and 4, there is shown another embodiment of the antenna unit of the invention which is generally similar to that shown in Figures 1 and 2 but in which the ferrite cores are mounted perpendicular to the mounting plate rather than parallel thereto, as in the preceding embodiment.

Thus an antenna unit constructed according to this embodiment of the invention may comprise a mounting plate 68 having the same general shape as the mounting plate in the preceding embodiment of the invention and having mounting blocks 70, 72 and 74 at the truncated apexes thereof. These mounting blocks are of the same general shape of those utilized in the preceding embodiment of the invention and are secured to the mounting plate with their outer faces 76 flush with the truncated apexes of the mounting plate. A series of flat headed screws 78 secure the mounting blocks to the mounting plate.

Each mounting block is provided with a vertical slot 80 and ferrite cores 82, 84 and 86 are mounted in these slots. A pair of identical loop coils 88 and 90 is wound on each ferrite core over a layer of electrical tape and the terminals 92, 94, 96 and 98 of these coils are connected to their respective connectors 100, 102 and 104. As with the preceding embodiment of the invention, the outer terminals 92 and 98 are connected together while the inner terminals 94 and 96 are connected to separate insulated contacts.

An antenna unit constructed as shown in Figures 3 and 4 occupies less lateral area than the unit of Figures 1 and 2, but has a greater vertical height. The same advantages of rapid low-cost assembly and uncriticality of loop spacing is obtained.

Both antenna units of this invention are simple in construction, utilize a minimum number of parts and require a minimum number of assembly steps. There is no criticality in the spacing of the loop elements and any electrical changes which occur by reason of changes in humidity, vibration, temperature, etc., are identical in the three loop units. Inasmuch as the three loops and three mounting blocks in any give unit are identical, it is possible to mass produce all such parts in the same manner, thereby effecting a savings in manufacturing costs.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An antenna unit comprising in combination, a planar insulating mounting plate having the shape of an equilateral triangle having truncated apexes, three spaced insulating mounting blocks mounted on said mounting plate at the apexes of said triangular mounting plate and secured thereto by screws passing through said mounting plate into said mounting blocks, three flat and elongated ferromagnetic cores disposed at 120° to one another and having their ends received in slots in said mounting blocks, each mounting block having a pair of intersecting surfaces at 120° from one another into which surfaces said slots are cut, an insulating layer on each core, a pair of spaced coils wound about each core and having their outer ends connected together and a plurality of connector means secured to said mounting plate and located within the equilateral triangle formed by said cores, the terminals of each coil being connected to an associated connector means.

2. An antenna unit as set out in claim 1 wherein said cores are parallel to said mounting plate.

3. An antenna unit as set out in claim 1 wherein said cores are perpendicular to said mounting plate.

References Cited in the file of this patent

UNITED STATES PATENTS

| | | |
|---|---|---|
| 1,799,576 | Wildhaber | Apr. 7, 1931 |
| 1,934,924 | Heintz | Nov. 14, 1933 |
| 2,383,415 | Polydoroff | Aug. 21, 1945 |
| 2,624,004 | Polydoroff | Dec. 30, 1952 |
| 2,817,082 | Dishal et al. | Dec. 17, 1957 |
| 2,824,306 | Pfaff | Feb. 18, 1958 |

FOREIGN PATENTS

| | | |
|---|---|---|
| 784,807 | Great Britain | Oct. 15, 1957 |